May 10, 1966   F. J. MOLTCHAN   3,250,397
WATER CONDITIONING FILTER UNIT
Filed Jan. 16, 1962
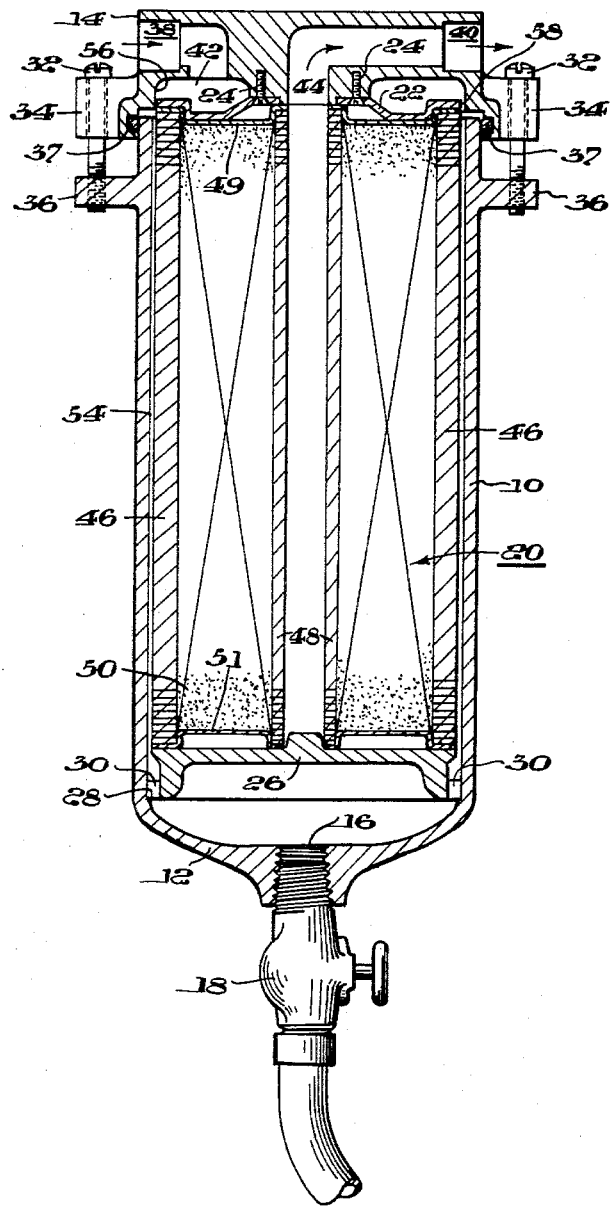
INVENTOR.
FLOYD J. MOLTCHAN
BY
Murray & Young
his
ATTORNEYS.

United States Patent Office 3,250,397
Patented May 10, 1966

3,250,397
WATER CONDITIONING FILTER UNIT
Floyd J. Moltchan, R.D. 1, P.O. Box 415, Canfield, Ohio
Filed Jan. 16, 1962, Ser. No. 166,512
1 Claim. (Cl. 210—409)

This invention relates to filter units and more particularly to a water filtering, softening and/or purifying unit.

As is known, the usual water softening unit consists, essentially, of a bed of some type of water softening agent through which the water passes, the softening agent acting to exchange the hardness-producing calcium or magnesium ions into unobjectionable sodium ions. Most of these units are rather large and expensive and, in addition, do not efficiently filter solid particles from the water. That is, any filtering of solid particles in such a unit usually occurs as a result of the water passing through the aforesaid bed. This causes the bed to become clogged with residue after a period of time, requiring a reverse flushing action to clean the solid particles from the water softening agent. The cleaning efficiency of a reverse flush, however, is relatively low with the result that the effectiveness of the water softening agent is soon decreased due to a more or less permanent clogging of the bed.

As an overall object, the present invention seeks to provide a water filter unit which overcomes the above and other disadvantages of prior art filters.

More specifically, an object of the invention is to provide apparatus of the type described which is much smaller than conventional prior art water filter units.

Another object of the invention is to provide new and improved means for cleaning a filter by the use of fluid pressure directed transversely across the filter surface.

A further object of the invention is to provide means for cleaning a filter unit wherein the cleaning action occurs more or less continually while the filter is in use as well as during a periodic flushing of the filter.

In accordance with the invention, I provide a filter unit of the type in which fluid to be filtered flows from an inlet port to an annular space around a tube-like filter cartridge while filtered fluid is removed through an outlet port which communicates with a central axially-extending passageway in the filter cartridge. The filter unit itself comprises concentric inner and outer tubular filters such that the water to be filtered will flow from the annular space around the filter cartridge through the outside filter where solid particles are removed, and thence to the inner filter where finer particles are removed. Between the inner and outer tubular filters is a water softening agent such as zeolite or activated carbon, the zeolite serving as a softening agent while the activated carbon acts to purify the water by adsorbing chlorine, sulfur and other similar impurities. After a filter of this type is used for a period of time, the outer periphery of the filter cartridge will become clogged with solid particles, and if no means are provided for cleaning these solid particles from the surface of the filter, a drop in pressure will be experienced at the outlet of the water conditioning unit. Accordingly, I further provide means whereby a circular stream of water at relatively high velocity is selectively caused to flow downwardly along the sides of the filter cartridge by opening a valve at the bottom of the filter unit. As will be seen, this action efficiently cleans the filter to extend the efficiency of the filter while in use. At the same time, the water softening agent between the tubular filters does not become appreciably contaminated with solid particles with the result that the effectiveness of the material is not reduced as in conventional water softeners. This not only enables the use of a smaller amount of water softening agent for a given capacity but also facilitates a small and compact unit, much smaller than conventional softening units presently in use.

The above and other objects and features of the invention will become apparent from the accompanying single figure drawing which is a cross-sectional view of the water conditioning and filtering unit of the invention.

Referring now to the drawing, the embodiment of the invention shown comprises an outer sleeve-like housing 10 having an integral cup-shaped closure 12 at its lower end and a removable closure 14 at its upper end. The closure 12 is provided with a threaded opening 16 which receives a hand valve 18. As will be seen, the valve 18 is normally closed but may be opened from time-to-time in order to flush-clean the periphery of the filter cartridge carried within housing 10.

The filter cartridge 20 itself is carried within the housing 10 between an annular stamping 22 which is fastened to the underside of the removable closure 14 by screws 24 and a circular member 26 which, in the embodiment shown herein, rests on an annular shoulder 28 at the bottom of housing 10. The outer periphery of member 26 is provided with a plurality of openings 30 to permit unobstructed flow of fluid therethrough.

The removable closure 14 is secured to housing 10 by means of screws 32 which pass through flanges 34 located on the closure 14 and threadedly engage projections 36 which are welded or otherwise integrally formed with the sleeve-like housing 10. As shown, an annular O-ring seal 37 is provided between the abutting edges of housing 10 and closure 14. Formed in the upper closure 14 is an inlet port 38 and an outlet port 40. The inlet port 38 communicates with an annular passageway 42 formed by the stamping 22; whereas the outlet port 40 communicates with a central axially-extending passageway 44. As will be understood, the flanges 34 and projections 36 are actually positioned so as to be out of the way of ports 38 and 40, and are illustrated in the positions shown herein for purposes of simplicity only.

Referring again to the filter cartridge 20, it comprises outer and inner coaxial filter elements 46 and 48 having their opposite ends abutting against stamping 22 and member 26, respectively. Each filter element 46 and 48 preferably comprises compressed cellulose fibers, however any suitable filtering material may be used. In the embodiment of the invention shown herein the outer filter 46 will retain any solid particles down to nominally five microns in particle size; whereas the inner filter 48 will retain particles down to about twenty-five micron size. The space 50 between the filters 46 and 48 is filled with a granulated water softening agent; however this may be replaced with activated carbon if it is desired to purify rather than soften the water. Alternatively, a mixture of both substances may be used between filters 46 and 48 if it is desired to combine the water softening and filtering effects. The softening agent and/or activated carbon, in granular form, are interposed between annular members 49 and 51 which are inserted into the space 50 between tubular filters 46 and 48 such that the filter cartridge 20 may be removed and replaced as a unit. If a water softening agent is used, it is preferably the sodium form of zeolite or some type of cation exchange resin. As the water passes through the zeolite, the objectionable calcium and/or magnesium ions are replaced with non-objectionable sodium ions. In the case of activated carbon, chlorine, sulfur and other similar impurities are adsorbed as the water passes between filters 46 and 48.

It will be noted that the outer peripheral diameter of the filter cartridge 20 is less than the inner peripheral diameter of housing 10 to provide an annular passageway 54 which extends down along the sides of the filter cartridge 20. Furthermore, the outer peripheral edge 56 of the passageway 42 in closure 14 is spaced from the peripheral edge of stamping 22 to provide annular space 58. In accordance with the present invention, the cross-sectional area of the space 58 and preferably that of passageway 54 are equal to the cross-sectional area of the inlet and outlet ports 38 and 40. In this manner, neither the annular space 58 nor passageway 54 will cause a substantial pressure drop between the inlet and outlet ports and, at the same time, will provide a fluid stream of sufficient velocity flowing downwardly through the annular passageway 54 to clean the outer periphery of the filter cartridge 20 when the valve 18 is open.

In operation, the water supply enters inlet port 38 and then passes into the annular passageway 42. From this passageway, the water then flows through space 58 in a circular stream down along the annular passageway 54 between the outer periphery of filter cartridge 20 and housing 10. As was mentioned above, the annular space 58 and passageway 54 are of the same cross-sectional area as inlet port 38. Consequently, the water passing through the space 58 will have the same velocity in a circular stream as that entering port 38. Assuming that the valve 18 is closed, the water will thereafter flow through outer filter 46, and in this process solid particles of relatively large size are separated from the water and collect on the outer periphery of the filter cartridge. After passing through filter unit 46, the water then passes through the bed 50 of zeolite and/or activated carbon. If it passes through the zeolite, any calcium or magnesium ions are replaced by sodium ions. On the other hand, if activated carbon is employed either alone or in combination with a water softening agent chlorine, sulfur and other impurities are adsorbed. Finally, the softened and/or purified water passes through the inner filter 48 which retains any solid particles down to approximately twenty-five micron size. The finally purified and softened water then passes out of the unit through outlet port 40.

As the filter is used, the velocity of the water in passageway 54 will effect at least a partial cleaning action, causing the solid particles on the outside of filter 46 to fall to the bottom of the unit. However, after the filter unit is in use for a certain period of time, the solid particles which are filtered out by the outer filter 46 will clog the filter unit and cut down its efficiency, as well as cause a pressure drop between inlet and outlet ports 38 and 40. Accordingly, in order to clean the filter cartridge, the valve 18 is opened, causing the circular stream of water in passageway 54 to flow downwardly at a relatively high velocity and through the openings 30 to the threaded port 16. In this process, the annular water jet stream flushes particles away from the outer periphery of the filter cartridge 20 and out through the valve 18. In this connection, the importance of the size of the annular space 58 and passageway 54 can be appreciated. That is, to get an efficient and thorough cleaning operation, the velocity of the water flowing downwardly in the annular passageway 54 should be as great as possible, thereby necessitating cross-sectional areas of the annular gap 58 and passageway 54 as small as possible. On the other hand, if the annular gap 58 or passageway 54 is smaller in cross-sectional area than that of the inlet port 38, there will necessarily be an undesirable pressure drop between the inlet and outlet ports. Accordingly, optimum results are achieved when the cross-sectional areas of space 58 and passageway 54 are equal to that of the inlet port 38. By cleaning the filter cartridge in the manner described above, the cartridge can be used for a much longer period of time than would be the case, for example, if no efficient cleaning action were provided.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

A filter unit comprising a sleeve-like outer housing having closures at its opposite ends, a generally tubular filter cartridge carried within said housing and having a centrally disposed axially extending passageway therein, a generally circular member positioned between one of said closures and one end of said filter cartridge, said circular member having an outer peripheral diameter which is less than the inner peripheral diameter of said housing whereby a first annular space is formed between the periphery of said circular member and the inner periphery of said housing, said filter cartridge having an outer peripheral diameter substantially equal to the outer peripheral diameter of said circular member whereby a second annular space is formed between the periphery of said filter cartridge and the inner periphery of said housing, an annular passageway formed in said one of said closures above said circular member and communicating with said first annular space, an inlet port communicating with said annular passageway, an outlet port communicating with said centrally disposed passageway in said filter cartridge, a drain outlet in the other of said closures, and a valve in said drain outlet, the path of fluid through said filter unit being from said inlet port through said annular passageway, said first annular space, said second annular space, said filter cartridge and said centrally disposed passageway to said outlet port, the cross-sectional area of said inlet port and said outlet port each being substantially equal to the cross-sectional area of each of said first and second annular spaces to prevent a substantial pressure drop across said first and second annular spaces while at the same time providing sufficient velocity to the fluid to clean the outer peripheral surface of said filter cartridge when said valve in said drain outlet is open, the fluid flowing only from said outlet port to said valve in said drain outlet during a cleaning operation with no fluid flowing through said outlet port.

References Cited by the Examiner

UNITED STATES PATENTS

| | | | |
|---|---|---|---|
| 528,652 | 11/1894 | Bowden | 210—443 X |
| 629,377 | 7/1899 | Leland | 210—497 X |
| 2,554,748 | 5/1951 | Lewis et al. | 210—440 X |
| 2,565,445 | 8/1951 | Winslow et al. | 210—130 |
| 2,796,989 | 6/1957 | Kovacs | 210—282 |

SAMIH N. ZAHARNA, *Primary Examiner.*

REUBEN FRIEDMAN, HERBERT L. MARTIN,
*Examiners.*